(12) United States Patent
Lee

(10) Patent No.: US 12,662,800 B2
(45) Date of Patent: Jun. 23, 2026

(54) SYSTEM AND METHOD OF CONTROLLING CONSTRUCTION MACHINERY

(71) Applicant: HD HYUNDAI INFRACORE CO., LTD., Incheon (KR)

(72) Inventor: Sanghoon Lee, Yongin-si (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 90 days.

(21) Appl. No.: 18/577,634

(22) PCT Filed: Jul. 5, 2022

(86) PCT No.: PCT/KR2022/009695
§ 371 (c)(1),
(2) Date: Jan. 8, 2024

(87) PCT Pub. No.: WO2023/282595
PCT Pub. Date: Jan. 12, 2023

(65) Prior Publication Data
US 2024/0328123 A1 Oct. 3, 2024

(30) Foreign Application Priority Data
Jul. 8, 2021 (KR) ........................ 10-2021-0089863

(51) Int. Cl.
*E02F 9/26* (2006.01)
*E02F 9/22* (2006.01)
(Continued)

(52) U.S. Cl.
CPC .............. *E02F 9/261* (2013.01); *E02F 9/264* (2013.01); *G06T 11/203* (2013.01); *G06V 20/56* (2022.01);
(Continued)

(58) Field of Classification Search
CPC ............. G06T 7/70; G06T 2207/20221; G06T 11/203; G06T 2210/62; G06T 5/50;
(Continued)

(56) References Cited

U.S. PATENT DOCUMENTS 11,541,827 B2 * 1/2023 Lee ........................... E02F 9/26
11,807,060 B2 * 11/2023 Kawata .............. B60G 17/0165
(Continued)

FOREIGN PATENT DOCUMENTS

CN          114375568  A       4/2022
JP          H10-299032  A      11/1998
(Continued)

OTHER PUBLICATIONS

International Search Report issued on Oct. 6, 2022, for corresponding International Patent Application No. PCT/KR2022/009695, along with an English translation (4 pages).
(Continued)

*Primary Examiner* — Asmamaw G Tarko
(74) *Attorney, Agent, or Firm* — Hauptman Ham, LLP

(57) ABSTRACT

A control system for construction machinery includes an upper camera installed in a cabin of a rear vehicle body to photograph the front of the cabin, a lower camera installed in a front vehicle body rotatably connected to the rear vehicle body to photograph the front of the front vehicle body, a tire monitoring portion configured to detect pressure information on a tire provided in the front vehicle body or the rear vehicle body, an image processing device configured to synthesize first and second images captured from the upper camera and the lower camera into one image, and configured to determine a position of a transparency processing area in the synthesized image according to the tire pressure information and transparency-process at least one of the first and second images in the transparency processing
(Continued)

10 area, and a display device configured to display the synthesized image transparency-processed by the image processing device.

16 Claims, 6 Drawing Sheets

(51) Int. Cl.

| | | |
|---|---|---|
| *G06T 11/20* | (2026.01) |
| *G06V 20/56* | (2022.01) |
| *H04N 7/18* | (2006.01) |

(52) U.S. Cl.
CPC ............ *H04N 7/181* (2013.01); *E02F 9/2285* (2013.01); *E02F 9/2292* (2013.01); *E02F 9/2296* (2013.01); *G06T 2210/62* (2013.01)

(58) Field of Classification Search
CPC .......... G06T 7/80; G06V 10/24; G06V 20/56; H04N 5/2625; H04N 7/181; E02F 9/261; E02F 9/264; E02F 9/2285; E02F 9/2292; E02F 9/2296; E02F 9/26; E02F 9/24; B60C 23/04
USPC ........................................................ 348/148
See application file for complete search history.

(56) References Cited

U.S. PATENT DOCUMENTS

| | | | | |
|---|---|---|---|---|
| 2007/0080792 | A1* | 4/2007 | Fukagawa ............... | B60R 25/33 |
| | | | | 340/429 |
| 2015/0116495 | A1 | 4/2015 | Kowatari et al. | |
| 2016/0101734 | A1* | 4/2016 | Baek ...................... | H04N 23/63 |
| | | | | 348/148 |
| 2017/0322560 | A1* | 11/2017 | Zhang ................... | G05D 1/0246 |
| 2019/0176560 | A1* | 6/2019 | Bittner ............... | B60G 17/0165 |
| 2021/0206330 | A1* | 7/2021 | Lee .......................... | G06T 11/00 |
| 2022/0220705 | A1* | 7/2022 | Lee ...................... | H04N 5/2621 |
| 2022/0329731 | A1* | 10/2022 | Park ....................... | H04N 23/90 |

FOREIGN PATENT DOCUMENTS

| | | | |
|---|---|---|---|
| JP | 2013-36243 | A | 2/2013 |
| JP | 2018-192891 | A | 12/2018 |
| KR | 10-1209796 | B1 | 12/2012 |
| KR | 10-1766711 | B1 | 8/2017 |
| KR | 10-1859229 | B1 | 5/2018 |
| KR | 10-2018-0082000 | A | 7/2018 |
| KR | 10-2018-0094686 | A | 8/2018 |
| KR | 10-2235123 | B1 | 4/2021 |
| WO | 2021/054756 | A1 | 3/2021 |
| WO | 2021/054758 | A1 | 3/2021 |

OTHER PUBLICATIONS

Written Opinion issued on Oct. 6, 2022, for corresponding International Patent Application No. PCT/KR2022/009695 (4 pages).
Extended European Search Report issued on Jun. 4, 2025, for corresponding European Patent Application No. 22837947.5 (5 pages).
Office Action issued on Dec. 9, 2025, for corresponding Korean Patent Application No. 10-2021-0089863, along with an English machine translation (10 pages).
Office Action issued on Dec. 31, 2025, for corresponding Chinese Patent Application No. 202280047660.8, along with an English machine translation (16 pages).

\* cited by examiner

FIG. 5

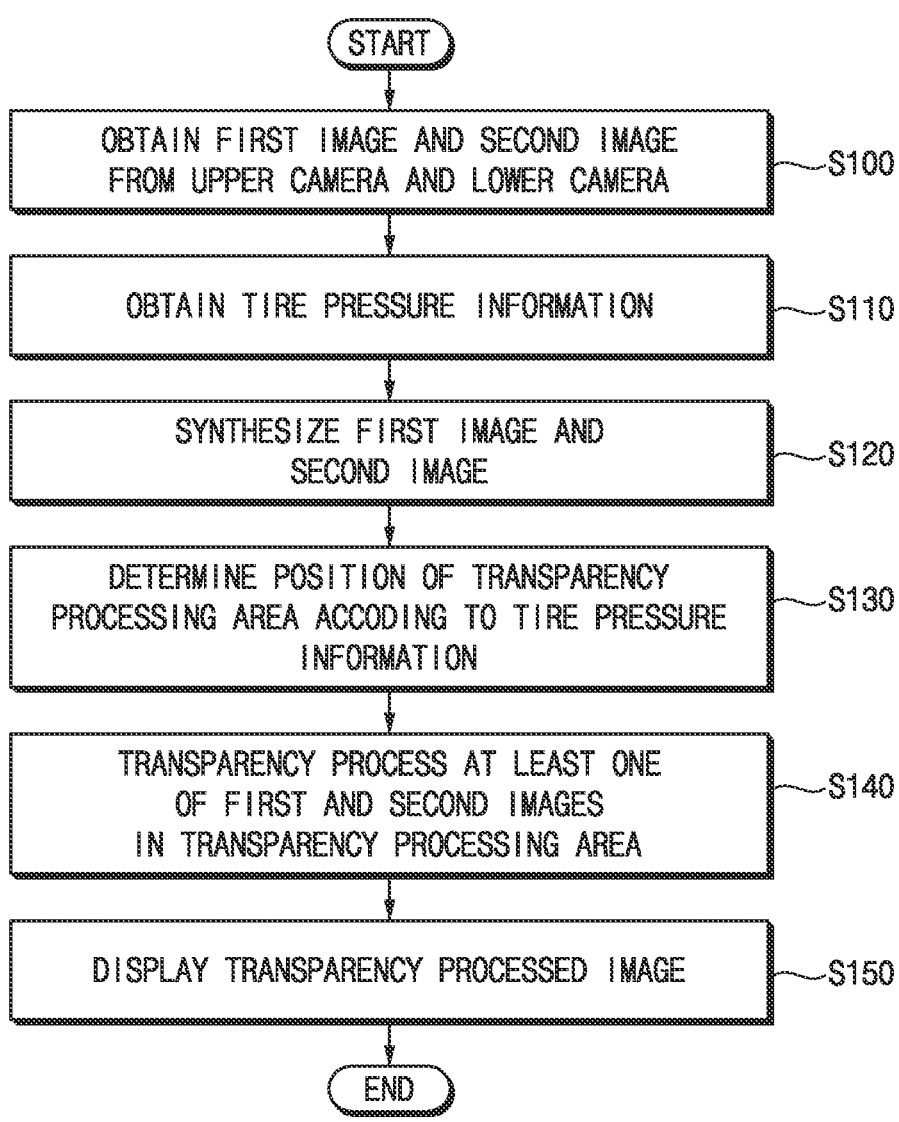

START

OBTAIN FIRST IMAGE AND SECOND IMAGE
FROM UPPER CAMERA AND LOWER CAMERA — S100

OBTAIN TIRE PRESSURE INFORMATION — S110

SYNTHESIZE FIRST IMAGE AND
SECOND IMAGE — S120

DETERMINE POSITION OF TRANSPARENCY
PROCESSING AREA ACCODING TO TIRE PRESSURE
INFORMATION — S130

TRANSPARENCY PROCESS AT LEAST ONE
OF FIRST AND SECOND IMAGES
IN TRANSPARENCY PROCESSING AREA — S140

DISPLAY TRANSPARENCY PROCESSED IMAGE — S150

END

SYSTEM AND METHOD OF CONTROLLING CONSTRUCTION MACHINERY

CROSS-REFERENCE TO RELATED APPLICATION

The present application is a national stage filing under 35 U.S.C § 371 of PCT application number PCT/KR2022/009695 filed on Jul. 5, 2022, which is based upon and claims the benefit of priorities to Korean Patent Application No. 10-2021-0089863 filed on Jul. 8, 2021, in the Korean Intellectual Property Office, which are incorporated herein in their entireties by reference.

TECHNICAL FIELD

The present invention relates to a control system and control method for construction machinery. More particularly, the present invention relates relate to a control system for recognizing forward obstacles when working or driving construction machinery such as a wheel loader, an excavator, etc., and a method of controlling construction machinery using the same.

BACKGROUND ART

In general, construction machinery such as a wheel loader, an excavator, etc., is widely used to excavate sand, gravel, and the like and load it into a dump truck. These works may be performed by driving a work apparatus installed in the construction machinery such as a bucket and a boom. However, the work apparatus may obstruct or limit an operator's front view while driving or travelling, and thus, obstruction of the operator's front view by the work apparatus may cause a safety accident.

DISCLOSURE OF THE INVENTION

Problems to be Solved

An object of the present invention provides a control system for construction machinery capable of improving forward visibility limited by a work apparatus.

Another object of the present invention provides a control method for construction machinery using the control system.

Means to Solve the Problems

According to example embodiments, a control system for construction machinery includes an upper camera installed in a driver cabin of a rear vehicle body to photograph the front of the driver cabin, a lower camera installed in a front vehicle body rotatably connected to the rear vehicle body to photograph the front of the front vehicle body, a tire monitoring portion configured to detect pressure information on a tire provided in the front vehicle body or the rear vehicle body, an image processing device configured to synthesize first and second images captured from the upper camera and the lower camera into one image, and configured to determine a position of a transparency processing area in the synthesized image according to the tire pressure information and transparency-process at least one of the first and second images in the transparency processing area, and a display device configured to display the synthesized image transparency-processed by the image processing device.

In example embodiments, the image processing device may include a correction value calculator configured to calculate a correction value for height adjustment of the upper camera and the lower camera from the tire pressure information detected by the tire monitoring portion, and a transparency processor configured to determine the position of the transparency process area in the synthesized image according to the calculated correction value.

In example embodiments, the correction value calculator may compare the detected tire pressure value with a preset standard pressure value to calculate height correction values for the upper camera and the lower camera.

In example embodiments, the control system may further include a work apparatus posture detection portion configured to detect a posture of a front work apparatus, and wherein the image processing device transparency-processes the at least one of the first and second images in the synthesized image according to the posture of the front work apparatus detected by the work apparatus posture detection portion.

In example embodiments, the image processing device may transparency-process the first image in the synthesized image when at least a portion of the front work apparatus invades a predetermined position, and the image processing device transparency-processes the second image in the synthesized image when the work apparatus does not invade the predetermined position In example embodiments, the control system may further include an input portion configured to set an image processing condition in the image processing device.

In example embodiments, the image processing condition may include a transparency processing switching timing of the first and second images or a ratio of the transparency processing area of the entire display area of the display device.

In example embodiments, the image processing device may process that, in the transparency processing area, an outline of an exterior of a boom or a bucket of the transparency-processed first and second images is displayed with a line or a dotted line.

In example embodiments, the outline of the transparency-processed boom or bucket may be displayed by transparency-processing an image of the boom or bucket that is taken from the first image or the second image.

In example embodiments, the image processing device may selectively transparency-process an image of a boom or a bucket coupled to the front vehicle body in the first and second images in the transparent processing area.

In example embodiments, the synthesized image may include an object recognized by the image processing device in the first image and the second image.

In example embodiments, the image processing device may recognize a person, animal, building or equipment as the object through a predetermined algorithm.

According to example embodiments, in a method of controlling construction machinery, a first image of the front of a driver cabin is obtained from an upper camera installed in the drive cabin of a rear vehicle body. A second image of the front of a front vehicle body is obtained from a lower camera installed in the front vehicle body rotatably connected to the rear vehicle body. Pressure information on a tire provided in the front vehicle body or the rear vehicle body is obtained. The first and second images are synthesized into one image. A position of a transparency processing area in the synthesized image is determined according to the obtained pressure information of the tire. At least one of the first and second images in the transparency processing area is transparency-processed. The transparency-processed image is displayed through a display device.

In example embodiments, determining the position of the transparency processing area according to the obtained pressure information of the tire may include calculating a correction value for height adjustment of the upper camera and the lower camera from the pressure information of the tire, and determining the position of the transparency process cess area in the synthesized image according to the calculated correction value.

In example embodiments, calculating the correction value for height adjustment of the upper camera and the lower camera from the pressure information of the tire may include comparing the detected tire pressure value with a preset standard pressure value to calculate height correction values for the upper camera and the lower camera.

In example embodiments, the method may further include detecting a posture of a front work apparatus, and transparency-processing the at least one of the first and second images in the transparency processing area may include transparency-processing the at least one of the first and second images in the synthesized image according to the detected posture of the front work apparatus.

In example embodiments, the method may further include setting an image processing condition under which the at least one of the first and second images is transparency processed.

In example embodiments, the image processing condition may include a transparency processing switching timing of the first and second images or a ratio of the transparency processing area of the entire display area of the display device.

Effects of the Invention

According to example embodiments, a first image and a second image captured from an upper camera installed in a driver cabin of a wheel loader and a lower camera installed in a front vehicle body may be synthesized into one image, a position of a transparent processing region in the synthesized image may be determined according to tire pressure information, at least one of the first and second images may be transparency-processed to be transparent in the synthesized image according to a position of a bucket or a boom connected to the front vehicle body, and the transparency-processed image may be displayed through a display device.

When the tire air pressure is lowered, the position of the transparency processing area may also be lowered as the overall height of the wheel loader is lowered. The position of the transparency processing area in the synthesized image may be automatically adjusted according to the tire pressure information obtained through a tire monitoring portion.

Accordingly, the transparency processing area may be automatically calibrated by reflecting changes in tire pressure, to thereby provide a more accurate front view and prevent safety accidents in advance.

However, the effect of the inventive concept may not be limited thereto, and may be expanded without being deviated from the concept and the scope of the present invention.

BRIEF DESCRIPTION OF THE DRAWINGS

FIG. 5 is a flow chart illustrating a control method for a wheel loader in accordance with example embodiments.

BEST MODE FOR CARRYING OUT THE INVENTION

Figure 1:
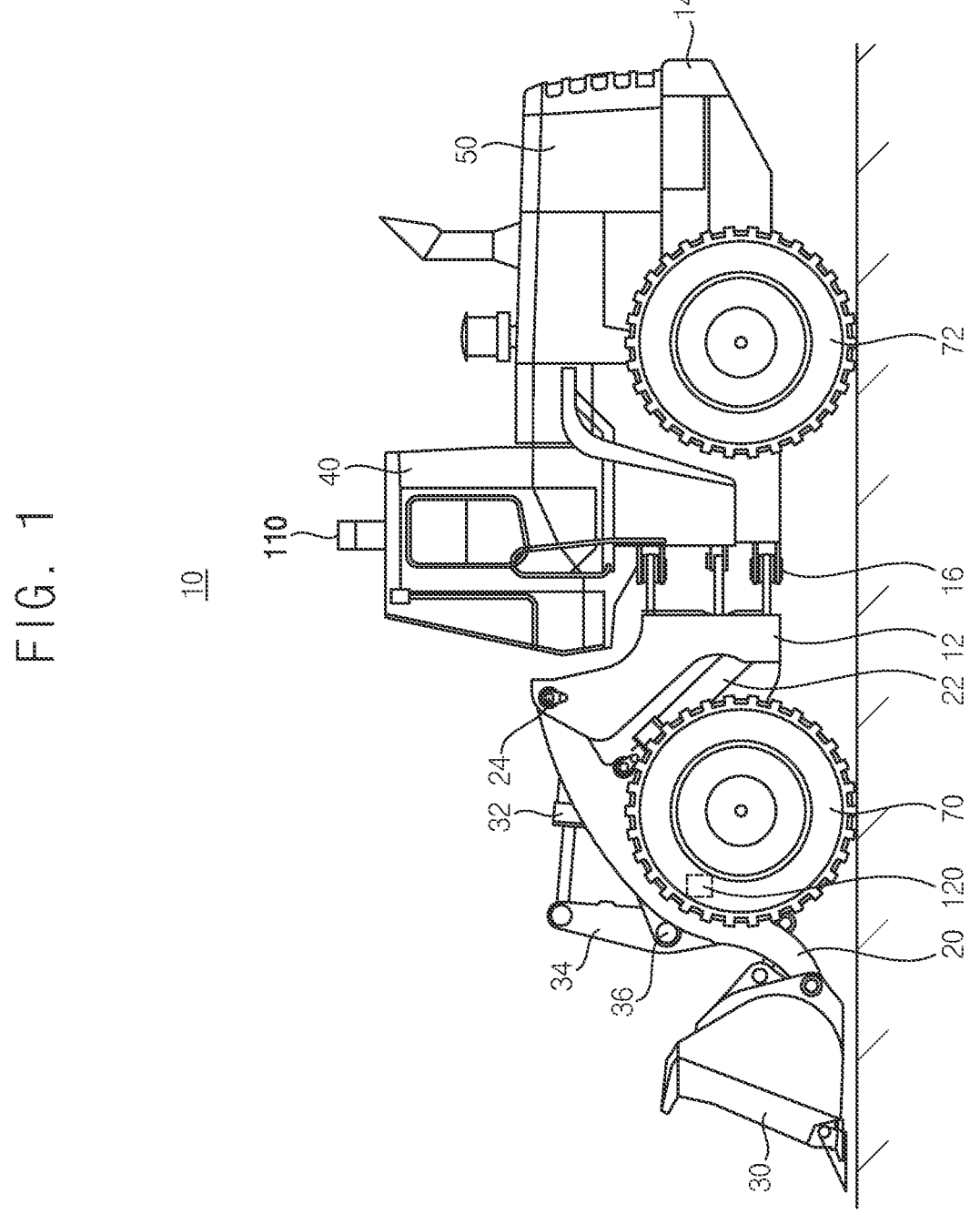
FIG. 1 is a side view illustrating construction machinery in accordance with example embodiments.

Hereinafter, preferable embodiments of the present invention will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

FIG. 1 is a side view illustrating construction machinery in accordance with example embodiments. Although a wheel loader 10 is illustrated in FIG. 1, a control device of construction machinery according to example embodiments is not limited to being used only in the wheel loader, but may be applied to an industrial vehicle such as an excavator, a forklift, etc. Hereinafter, for convenience of description, only the wheel loader 10 will be described.

Referring to FIG. 1, construction machinery 10 may include a vehicle body 12, 14, a driver cabin 40, and a front work apparatus. The vehicle body of the wheel loader 10 in FIG. 1 may include, for example, a front vehicle body 12 and a rear vehicle body 14 rotatably connected to each other. The front vehicle body 12 may include the front work apparatus and a front wheel 70. The rear vehicle body 14 may include the driver cabin 40, an engine bay 50 and a rear wheel 72.

The front work apparatus may include a boom 20 and a bucket 30. The boom 20 may be freely pivotally attached to the front vehicle body 12, and the bucket 30 may be freely pivotally attached to an end portion of the boom 20. The boom 20 may be coupled to the front vehicle body 12 by a pair of boom cylinders 22, and the boom 20 may be pivoted upwardly and downwardly by expansion and contraction of the boom cylinders 22. A tilt arm 34 may be freely rotatably supported on the boom 20, almost at its central portion. One end portion of the tilt arm 34 may be coupled to the front vehicle body 12 by a pair of bucket cylinders 32 and another end portion of the tilt arm 34 may be coupled to the bucket 30 by a tilt rod, so that the bucket 30 may pivot (crowd and dump) as the bucket cylinders 32 expand and contract.

Additionally, the front vehicle body 12 and the rear vehicle body 14 may be rotatably connected to each other through a center pin 16 so that the front vehicle body 12 may swing side to side with respect to the rear vehicle body 14 by expansion and contraction of a steering cylinder (not illustrated).

A travel apparatus for propelling the wheel loader 10 may be mounted at the rear vehicle body 14. An engine (not illustrated) may be provided in the engine bay to supply an output power to the travel apparatus. The travel apparatus may include a torque converter, a transmission, a propeller shaft, axles, etc. The output power of the engine may be transmitted to a front wheel 70 and a rear wheel 72 through the torque converter, the transmission, the propeller shaft and the axles, and thus the wheel loader 10 may travels.

A hydraulic pump (not illustrated) for supplying a pressurized hydraulic oil to the boom cylinder 22 and the bucket cylinder 32 of the work apparatus may be mounted at the rear vehicle body 14. The hydraulic pump may be driven using at least a portion of the power outputted from the engine. For example, the output power of the engine may drive the hydraulic pump for the work apparatus and a hydraulic pump for the steering cylinder via a power transmission device such as a gear train.

The hydraulic pump may supply the hydraulic oil to drive the work apparatus, and may be divided into a variable capacity type and a constant capacity type. A pump control device (EPOS, Electronic Power Optimizing System) may be connected to the variable capacity hydraulic pump, and an amount of the hydraulic oil discharged from the variable capacity hydraulic pump may be controlled by the pump control device. A main control valve (MCV) including a boom control valve and a bucket control valve may be installed on a hydraulic circuit connected to the hydraulic pump. The hydraulic oil discharged from the hydraulic pump may be supplied to the boom cylinder 22 and the bucket cylinder 32 through the boom control valve and the bucket control valve of the main control valve MCV. The main control valve (MCV) may control supply of the hydraulic oil discharged from the hydraulic pump to the boom cylinder 22 and the bucket cylinder 32 according to a pilot pressure signal in proportion to an operation rate of an operating lever. Thus, the boom 20 and the bucket 30 may be driven by the pressure of the hydraulic oil discharged from the hydraulic pump.

The driver cabin 40 may be installed on the vehicle body of the construction machinery, and in case of the wheel loader, the drive cabin 40 may be installed on the rear vehicle body 14. A maneuvering device may be provided within the driver cabin 40. The maneuvering device may include an acceleration pedal, a brake pedal, an FNR travel lever, the operating levers for operating cylinders such as the boom cylinder 22 and the bucket cylinder 32, etc.

As mentioned above, the wheel loader 10 may include a traveling operating system for driving the travel apparatus via the power transmission device and a hydraulic operating system for driving the work apparatus such as the boom 20 and the bucket 30 using the output power of the engine 100.

Hereinafter, a control system for the construction machinery will be explained using the wheel loader as an example.

Figure 2:
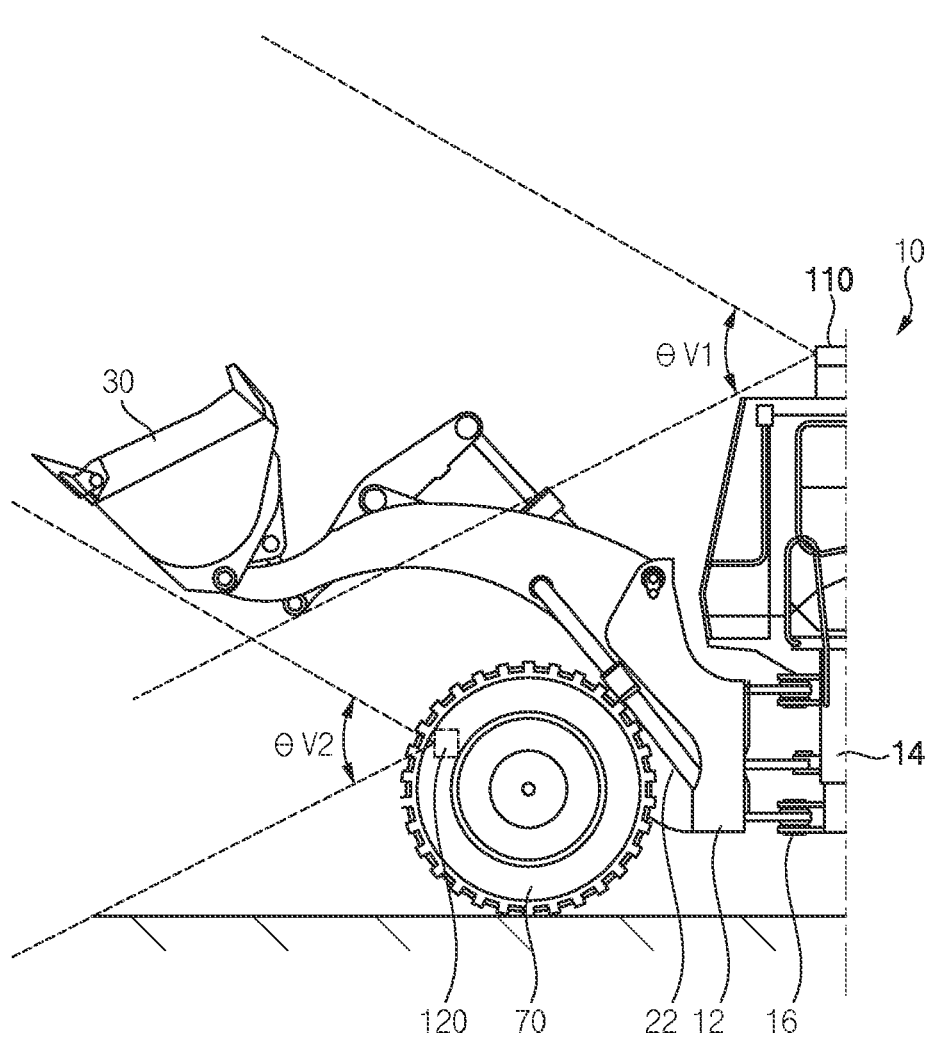
FIG. 2 is a side view illustrating bucket elevation positions according to rotation angles of a boom in FIG. 1.
Figure 3:
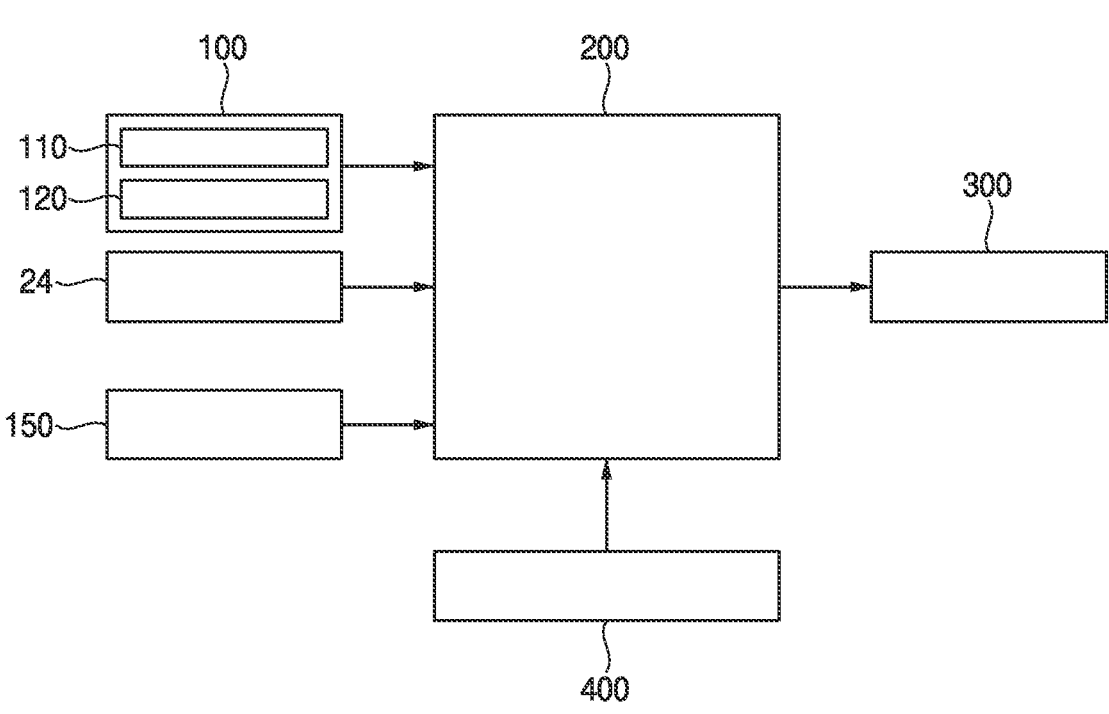
FIG. 3 is a block diagram illustrating a control system for the construction machinery in FIG. 1.
Figure 4:
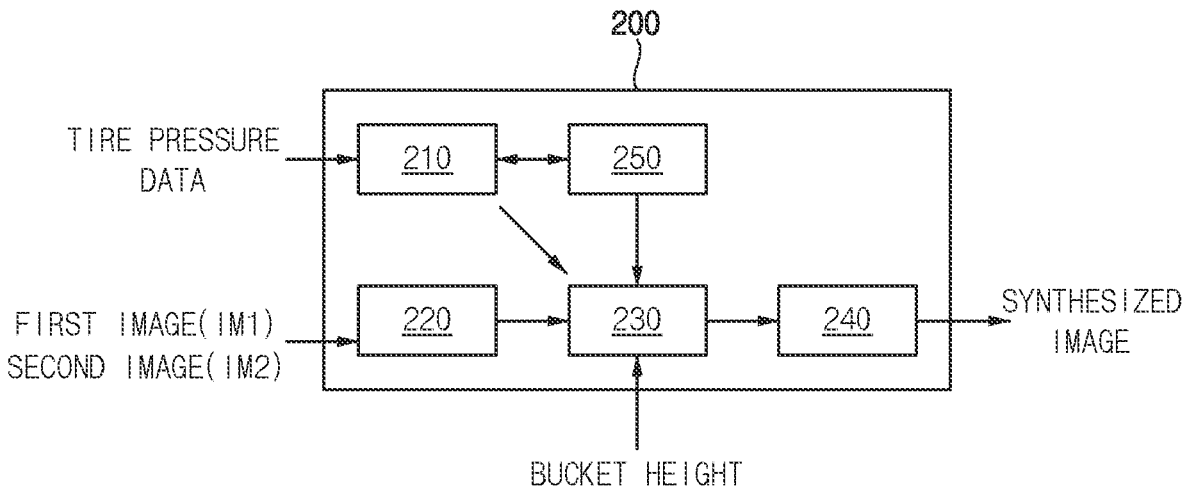
FIG. 4 is a block diagram illustrating an image processing device in FIG. 4.

FIG. 2 is a side view illustrating bucket elevation positions according to rotation angles of a boom in FIG. 1. FIG. 3 is a block diagram illustrating a control system for the construction machinery in FIG. 1. FIG. 4 is a block diagram illustrating an image processing device in FIG. 4.

Referring to FIGS. 1 to 4, a control system for the wheel loader may include a camera portion 100 installed in the wheel loader 10 to photograph the front of the wheel loader 10, a tire monitoring portion 150 configured to obtain pressure information of tires respectively provided in the front vehicle body 12 and the rear vehicle body 14, an image processing device 200 configured to process an image from the camera portion 100 in real time, and a display device 300 configured to display the image processed by the image processing device 200. Additionally, the control system for the wheel loader may further include a work apparatus posture detection portion configured to detect a posture of the front work apparatus connected to the front vehicle body 12 and an input portion 400 configured to set an image processing condition in the image processing device 200.

The image processing device 200 for the wheel loader 10 such as a portion of an engine control unit ECU or a vehicle control unit VCU, or a separate control unit may be mounted in the rear vehicle body 14. The image processing device 200 may be implemented with dedicated hardware, software, and circuitry configured to perform the functions described herein. These elements may be physically implemented by electronic circuits such as logic circuits, discrete components, microprocessors, hard-wired circuits, memory elements, wiring connections, and the like.

In example embodiments, the camera portion 100 may monitor the front of the wheel loader 10 when the wheel loader 10 travels or works, and may include a plurality of cameras. In particular, the camera portion 100 may include an upper camera 110 installed in the driver cabin 40 and configured to photograph the front of the driver cabin 40 to capture a first image IM1 and a lower camera 120 installed in the front vehicle body 12 and configured to photograph the front of the front vehicle body 12 to capture a second image IM2. Although one upper camera and one lower camera are illustrated in FIGS. 1 and 2, it may not be limited thereto, and a plurality of the upper cameras and a plurality of the lower cameras may be provided.

The upper camera 110 may have a first vertical viewing angle (Field of View, FoV) $\theta v1$ and a first horizontal viewing angle $\theta h1$ based on the front direction of the wheel loader. For example, the first vertical viewing angle and the first horizontal viewing angle may have an angular range of 60 degrees to 120 degrees. The lower camera 120 may have a second vertical viewing angle $\theta v2$ and a second horizontal viewing angle $\theta h2$ based on the front direction of the wheel loader. For example, the second vertical viewing angle and the second horizontal viewing angle may have an angular range of 60 degrees to 120 degrees.

The first image may be an image captured with a focus on a front upper region through the upper camera 110, and the second image may be an image captured with a focus on a front lower region through the second camera 120.

By setting the first vertical viewing angle θv1 of the upper camera 110 and the second vertical viewing angle θv2 of the lower camera 120 to partially overlap, the first image and the second image may partially overlap each other.

In example embodiments, the tire monitoring portion 150 may include a tire pressure monitoring system (TPMS) configured to monitor the air pressure of the tires provided on the front wheel 70 and the rear wheel 72. The tire pressure monitoring system may be a system that is able to prevent the risk of an accident in advance by measuring the air pressure of the tire to inform the driver of tire information, and providing a warning signal when the tire pressure falls below a specified pressure.

For example, the tire monitoring portion 150 may include a pressure sensor configured to detect the air pressure of the tire and a TPMS controller configured to receive a signal (pressure value) output from the pressure sensor. The TPMS controller may transmit tire air pressure data to the image processing device 200 (or vehicle control device). The tire air pressure data from the pressure sensor may be transmitted to the TPMS controller through wireless communication. The TPMS controller may transmit the tire air pressure data to the image processing device 200 through a CAN network.

As will be described later, the control system for the wheel loader may receive tire pressure information from the tire monitoring portion 150 and may automatically calibrate a position of a transparency processing area in a display area of the display device 300 based on the tire pressure information.

In example embodiments, the work apparatus posture detection portion may detect whether the front work apparatus invades the transparency processing area in the display area of the display device 300. As described later, transparency processing may be performed on the captured image when the work apparatus invades a predetermined position, that is, an actual position corresponding to the predetermined transparency processing area among the entire display area of the display device 300, so that an operator's view may be secured. The posture of the front work apparatus may include a position of the bucket 30 (a height of the bucket from the ground) or a posture of the boom 20 (a rotation angle of the boom). To this end, the work apparatus posture detection portion may include a boom angle sensor 24 for detecting the position of the bucket 30 or the posture of the boom 20. In addition, the work apparatus posture detection portion may include a bucket angle sensor (not illustrated) for detecting a relative rotation angle between the boom 20 and the bucket 30. The work apparatus posture detection portion may include a displacement sensor for detecting a stroke of the cylinder driving the boom 20, in place of the boom angle sensor 24.

Further, the work apparatus posture detection portion may include an image analysis device (for example, shape recognition portion) that analyzes an image of the front work apparatus captured through the camera to determine the posture of the front work apparatus.

The boom angle sensor 24 may detect the rotation angle of the boom 20 and provide information on the position of the bucket 30 based on the rotation angle of the boom 20. As illustrated in FIG. 2, the rotation angle of the boom 20 may be an angle θ between an extension line L at the lowest position (0%) of the boom 20 (bucket 30) and an extension line R at an elevated position of the boom 20. The rotation angle of the boom 20 at the highest position of the boom 20 (max boom height) is θmax.height, and in this case, the boom (bucket) position may be the maximum height (100%).

In example embodiments, the image processing device 200 may synthesize the first image IM1 and the second image IM2 captured by the upper camera 110 and the lower camera 120 into one image, and may determine the position of the transparency processing area in which at least one of the first and second images in the synthesized image is transparency-processed according to the pressure information of the tire obtained from the tire monitoring portion 150. The image processing device 200 may include a correction value calculator 210, an image synthesizer 220, a transparency processor 230, an image rendering portion 240 and a storage portion 250. The image processing device 200 may be installed in the form of a control device embedded in the control device or the display device of the construction machinery.

In particular, the correction value calculator 210 may calculate a correction value for height adjustment of the upper camera 110 and the lower camera 120 from the tire pressure information detected by the tire monitoring portion 150. The correction value calculator 210 may calculate height correction values for the upper camera 110 and the lower camera 120 by comparing the detected tire pressure value with a preset standard pressure value (reference value).

The storage portion 250 may store prescribed pressure data, conversion table data for a correction value according to a difference between the prescribed pressure value and the detected tire pressure value, position data of the transparency processing area according to the parameter values of the camera, etc.

The image synthesizer 220 may synthesize the first image IM1 and the second mage IM2 into one image. The image synthesizer 220 may match the first image and the second image captured by the upper camera 110 and the lower camera 120 to find portions of images that overlap (are duplicated) in the first and second images and match the overlapping portions of the images into one synthesized image. The transparency processor 220 may transparency-process at least one of the first and second images in the transparency processing area. The image rendering portion 230 may render the image-processed synthetic image into a 3D image. The image rendering portion 230 may process the synthesized image to be displayed like a real image and output the rendering-processed synthesized image to the display device 300. The functions of the image synthesizer 220, the transparency processor 230 and the image rendering portion 240 may be implemented through a single processor such as GP or CPU for image processing, or through computational processing of separate processors.

In example embodiments, the transparency processor 230 may perform transparency processing at least one of the first and second images to be transparent in the synthesized image according to the detected posture of the work apparatus. The transparency processor 230 may transparency-process at least one of the first and second images to be transparent only in the transparency processing area, that is, a partial area of the entire display area of the display device 300. The transparency processing area may be defined to include an area in which the front view is obscured by the front work apparatus including the elevating boom 20 and the bucket 30.

In the transparency processing, the portions of the first image and/or the second image within the transparency processing area of the synthesized image may be removed or translucently processed to overlap the background image, or an outline of an exterior of the first image and/or the second image may be two-dimensionally drawn with a line or dotted line so that only the shape may be identified. For example, the portions of the first image or the second image in the transparency processing area may be removed from the synthesized image using an alpha blending technique.

Additionally, in the transparency processing, a portion in any one selected from the first image and the second image captured by the upper camera 110 and the lower camera 120 or portions of the first and second images may be processed to be transparent. For example, a portion of the image including the boom or bucket of the front working apparatus may be selectively processed to be transparent in the transparency processing area.

In example embodiments, the transparency processor 230 may perform transparency processing in response to a case in which at least a portion of the front work apparatus invades a position corresponding to the transparency processing area. When the bucket or boom position is lower than a predetermined position (transparency switching position), which can be determined that the at least a portion of the front work apparatus does not invade the transparency processing area, the second image in the synthesized image may be transparency-processed to be transparent. On the other hand, when the bucket or boom position is higher than the predetermined position (transparency switching position), which can be determined that the at least a portion of the front work apparatus invades the transparency processing area, the first image in the synthesized image may be transparency-processed to be transparent. For example, the predetermined position of the boom may be set such that the rotation angle $\theta$ of the boom 20 is within a range of 15 degrees to 20 degrees.

When the bucket 30 is positioned between the lowest position (0%) and the predetermined bucket position, that is, the transparency switching position which is the boundary of the transparency processing area, the second image captured from the lower camera 120 may be transparency-processed, so that an object implemented by the upper camera 110 may be displayed as a main point (focus). In the second image captured from the lower camera 120, when the bucket 30 is in a relatively low position, the front view of the front vehicle body 12 may be obscured by the front work apparatus including the boom 20 and the bucket 30. The transparency processor 230 may process the second image to be transparent and display the first image as a focus to thereby prevent the front view from being obscured by the front work apparatus.

When the bucket 30 is positioned between the predetermined bucket position and the highest position (100%) of the transparency processing area, the first image captured from the upper camera 110 may be transparency-processed, so that an object implemented by the lower camera 120 may be displayed as a main point (focus). In the first image captured from the upper camera 110, when the bucket 30 is in a relatively high position, the front view of the front vehicle body 12 may be obscured by the front work apparatus including the boom 20 and the bucket 30. The transparency processor 230 may process the first image to be transparent and display the second image as a focus to thereby prevent the front view from being obscured by the front work apparatus.

When the bucket 30 is lifted or lowered to pass through the predetermined bucket position (transparency switching position), an image located in the transparency processing area transparency-processed by the transparency processor 230 may be converted from the second image to the first image or from the first image to the second image.

Alternatively, the transparency processor 230 may transparency-process the second image in the synthesized image to be transparent when the rotation angle $\theta$ of the boom is within a first angle range, transparency-process the first and second images in the transparency processing area of the synthesized image to be transparent when the rotation angle $\theta$ of the boom is within a second angle range, and transparency-process the first image in the synthesized image to be transparent when the rotation angle $\theta$ of the boom is within a third angle range. For example, the first angle range may be within 0 degree to 15 degrees, the second angle range may be within 15 degrees to 25 degrees, and the third angle range may be within 25 degrees to 45 degrees.

In example embodiments, the transparency processor 230 may selectively process an image portion of the boom or bucket that is a portion of the front work apparatus among the first and second images in the transparency processing area to be transparent, and may display the transparency-processed synthesized image through the display device 300. In the transparency processing area, an outline of an exterior of the boom or bucket of the transparency-processed first and second images may be displayed with a line, a dotted line, or a shade, so that only the shape can be identified. The outline of the boom or bucket displayed in the transparent processing area may be taken from an image actual first or second image, and may be displayed to match the movement of the boom or bucket according to the actual operation of a driver.

In example embodiments, the image processing device apparatus 200 may recognize an object in the first image or the second image which are to be transparency-processed, and may process that an outline of the recognized object is displayed with a dotted line or the like. For example, a computing device may identify an object in an image based on a predetermined algorithm or the like, and may generate a synthesized image by displaying an outline of the object. In this case, the driver may simply check a partial shape of the transparency-processed wheel loader 10 by using a dotted outline or the like.

In example embodiments, an image processing condition in the image processing device 200 may be set through the input portion 400. For example, the image processing condition may include a location, a size, etc. of the transparency processing area. As the transparency processing area is determined, the transparency switching position of the first and second images, a ratio of the transparency processing area in the entire display area of the display device 300, and the like may be set. For example, the transparency switching position may represent a boundary position of the transparency processing area, and when the bucket 30 moves to be located at the boundary of the transparency processing area, the bucket 30 may be considered to be located at a predetermined position for transparency switching. The size and location of the transparency processing area, the transparency switching timing, etc. may be fixedly set by a manufacturer according to a type of equipment, and may be freely changed and set by the operator or maintenance personnel.

For example, the input portion 400 may be implemented in a form of an instrument panel option, and the operator may change the timing point for the transparency switching, the area to be processed for transparency, and the like through the input portion 400.

As mentioned above, when the transparency processing area and the transparency switching timing are set, the display device 300 may display an image by dividing the image captured by the camera portion into the transparency processing area R and an external area of the transparency processing area R. The display device 300 may additionally display an outline of the transparency processing area R such that the transparency processing area R can be distinguished, or may not display the outline of the transparency processing area and may display the transparency-processed image to be connected to an image of the external area of the transparency processing area R.

Additionally, the display device 300 may display the first image in the external area of the transparency processing area R, and may display a transparency image in which at least one of the first image and the second image is displayed as a focus according to the progress of the transparency processing, within the transparency processing area R.

For example, when the bucket 30 is located in the external area of the transparency processing area R, the display device 300 may display only the first image that interconnects the transparency processing area R and the external area of the transparency processing area R. Alternatively, a transparency-processed image in which the first image is displayed as a focus may be displayed within the transparency processing area R. In this case, the operator may recognize that the display device 300 displays the first image as a whole due to the transparency image in which the first image is displayed as the focus. Additionally, when at least a portion of the bucket 30 is located within the transparency processing area R, the display device 300 may display a transparency-processed image in which the second image is displayed as a focus or the second image within the transparency processing area R, and may display the first image in which only the image in the transparency processing area R is excluded, in the external area of the transparency processing area.

In example embodiments, the transparency processor 230 may determine the position of the transparency processing area in the synthesized image according to the tire pressure information obtained from the tire monitoring portion 150. The transparency processor 230 may adjust the position of the transparency processing area according to the correction values for height adjustment of the upper camera 110 and the lower camera 120 calculated by the correction value calculator 210.

The position of the transparency processing area may be determined based on parameter values (position value, vertical angle, left and right angle, tilt, etc.) of the upper camera 110 and lower camera 120. When the tire air pressure decreases, the overall height of the wheel loader may decrease, and accordingly, the parameter values (Z position values) of the upper camera 110 and lower camera 120 may change. The correction value calculator 210 may calculate a correction value for adjusting the heights of the upper camera 110 and the lower camera 120 by inversely calculating a height change according to the change in tire air pressure. The transparency processor 230 may automatically change the position of the transparency processing area by reflecting the calculated correction value as a corrected parameter value.

Hereinafter, a method of controlling construction machinery using the control system for construction machinery in FIG. 3 will be explained. The following description will also be described based on the wheel loader as in the above-described method.

Figure 6:
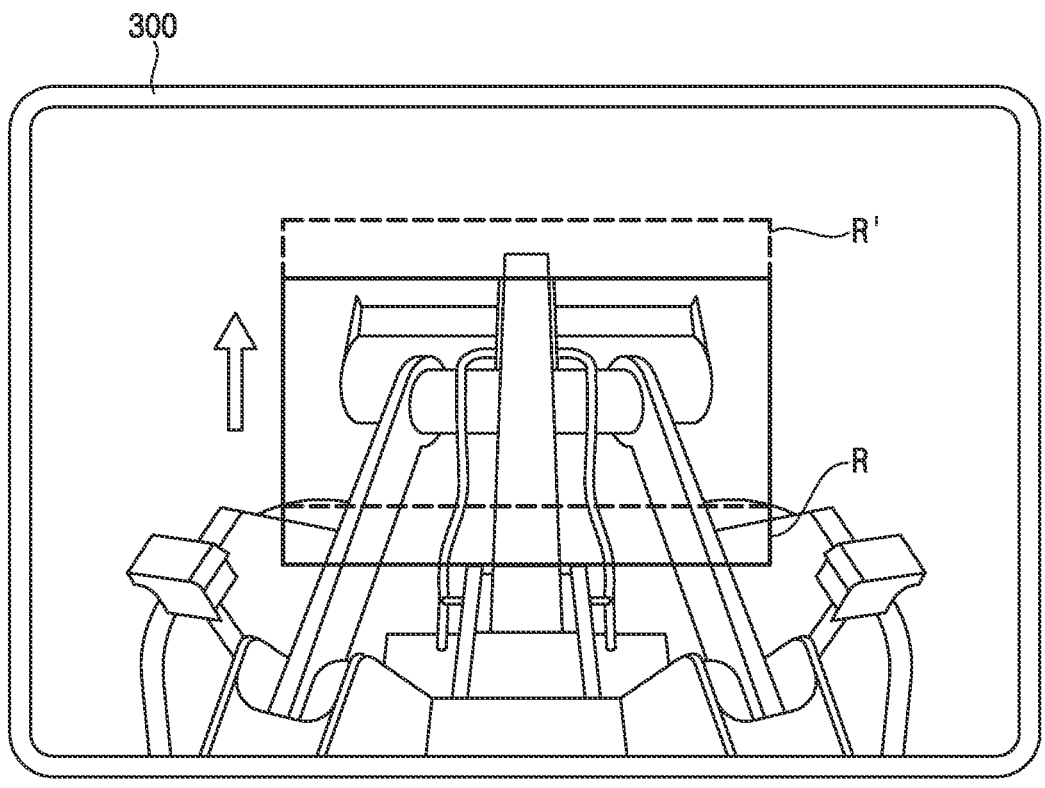
FIG. 6 is a view illustrating a screen on which a first image captured by the upper camera of FIG. 3 is displayed on a display device in a cab.
Figure 7:
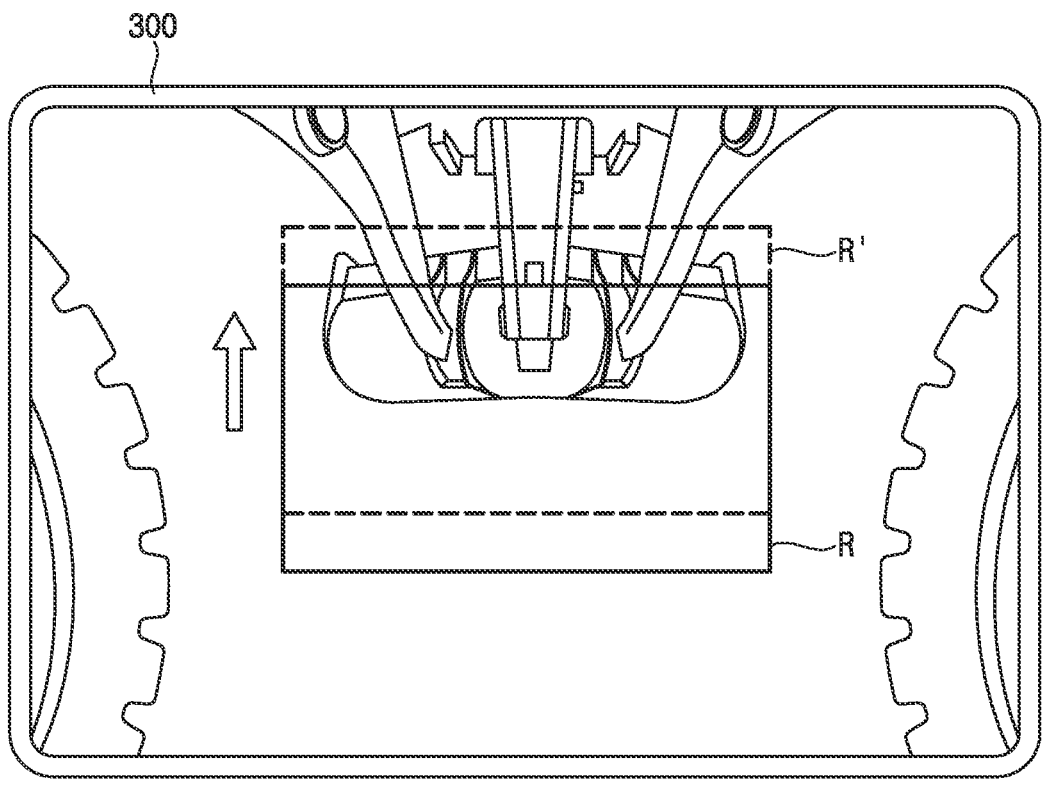
FIG. 7 is a view illustrating a screen on which a second image captured by the lower camera of FIG. 3 is displayed on the display device in the cabin.

FIG. 5 is a flow chart illustrating a control method for a wheel loader in accordance with example embodiments. FIG. 6 is a view illustrating a screen on which a first image captured by the upper camera of FIG. 3 is displayed on a display device in a cab. FIG. 7 is a view illustrating a screen on which a second image captured by the lower camera of FIG. 3 is displayed on the display device in the cabin.

Referring to FIGS. 1 to 7, first, a first image IM1 and a second image IM2 may be obtained respectively through an upper camera 110 and a lower camera 120 installed in a wheel loader 10 (S100), and pressure information of tires provided in the wheel loader 10 may be obtained (S110). The first image IM1 and the second image IM2 may be synthesized into one image (S120), and a position of a transparency processing area may be determined according to the tire pressure information (S130).

In example embodiments, the first image IM1 for the front of a driver cabin 40 may be obtained using the first camera 110 installed in the driver cabin 40. The second image IM2 for the front of the front vehicle body 12 may be obtained using the second camera 120 installed in the front vehicle body 12.

The first image may be an image captured with a focus on a front upper region of the wheel loader through the upper camera 110, and the second image may be an image captured with a focus on a front lower region through the second camera 120. A first vertical viewing angle θv1 of the upper camera 110 and a second vertical viewing angle θv2 of the lower camera 120 may be set to partially overlap and a first horizontal viewing angle θh1 of the upper camera 110 and a second horizontal viewing angle θh2 of the lower camera 120 may be set to partially overlap, the first image and the second image may partially overlap each other.

In example embodiments, the pressure information of the tires provided on the front wheel 70 and rear wheel 72 may be obtained from the tire monitoring portion 150. The tire monitoring portion 150 may detect the air pressure of the tire and may transmit the tire air pressure data to the image processing device 200.

In example embodiments, the image processing device 200 may match the first image IM1 and the second image IM2 to synthesize the first image and the second mage into one image. Additionally, the image processing device 200 may determine a position of the transparency processing area in the synthesized image according to the tire pressure information obtained by the tire monitoring portion 150.

A correction value calculator 210 of the image processing device 200 may calculate a correction value for height adjustment of the upper camera 110 and the lower camera 120 from the tire pressure information detected by the tire monitoring portion 150. The correction value calculator 210 may calculate height correction values for the upper camera 110 and the lower camera 120 by comparing the detected tire pressure value with a preset standard pressure value (reference value).

A transparency processor 230 of the image processing device 200 may adjust the position of the transparency processing area in the synthesized image according to the correction values for height adjustment of the upper camera 110 and the lower camera 120 calculated by the correction value calculator 210.

As illustrated in FIGS. 6 and 7, when the tire air pressure decreases, the overall height of the wheel loader may decrease, and accordingly, the initially set position of the transparency processing area R may be also lowered. The correction value calculator 210 of the image processing device 200 may calculate a correction value for adjusting the heights of the upper camera 110 and the lower camera 120 by inversely calculating a height change according to the change in tire air pressure, and the transparency processor 230 of the image processing device 200 may set a transparency processing area R' at a newly changed position by reflecting the calculated correction value as a corrected parameter value.

Then, at least one of the first and second images may be transparency processed in the newly set transparency processing area R' (S140), and the transparency-processed synthesized image may be displayed through the display device 300 (S150).

In example embodiments, a posture of the front working apparatus may be detected. A rotation angle of a boom 20 connected to the front vehicle body 12 may be detected. Information on a position of a bucket 30, that is, a height of the bucket 30 from the ground may be detected by a boom angle sensor 24. An elevated height of the bucket may be determined from the rotation angle of the boom 20 detected by the boom angle sensor 24.

As illustrated in FIG. 2, the rotation angle of the boom 20 may be an angle $\theta$ between an extension line L at the lowest position (0%) of the boom 20 and an extension line R at an elevated position of the boom 20. The rotation angle of the boom 20 at the highest position of the boom 20 (max boom height) is $\theta$max.height, and in this case, the bucket position may be the maximum height (100%).

Then, whether or not the bucket position is lower than a predetermined position (transparency switching position) may be determined. The predetermined position may be the transparency switching position which is the boundary of the transparency processing area R'. That is, the comparison between the position of the bucket and the predetermined position may include checking whether a portion of the bucket 30 or the boom 20 is located within the transparency processing area R'. When the bucket or the boom is lower than the predetermined position, the second image in the synthesized image may be transparency processed, and when the bucket or the boom is higher than the predetermined position, the first image in the synthesized image may be transparency processed. Here, the predetermined position may be a lower boundary of the predetermined transparency processing area R' based on an image displayed through the display device 300. Then, the transparency-processed synthesized image may be displayed through the display device 300. In this case, the display device 300 may display the first image in an external area of the transparency processing area R'.

In example embodiments, the image processing device 200 may perform transparency processing at least one of the first and second images to be transparent in the synthesized image according to the detected boom position.

The transparency processor 230 may transparency-process the first and second images to be transparent only in the transparency processing area R', that is, a partial area of the entire display area of the display device 300. The transparency processing area R' may be defined to include an area in which the front view is obscured by the front work apparatus including the elevating boom 20 and the bucket 30.

In the transparency processing, the portions of the first image and/or the second image within the transparency processing area R' of the synthesized image may be removed or translucently processed to overlap the background image, or an outline of an exterior of the first image and/or the second image may be two-dimensionally drawn with a line or dotted line so that only the shape may be identified. For example, the portions of the first image or the second image in the transparency processing area may be removed from the synthesized image using an alpha blending technique.

When the bucket 30 or the boom 20 is positioned between the lowest position (0%) and the predetermined bucket or boom position, the second image captured from the lower camera 120 may be transparency-processed, so that an object implemented by the upper camera 110 may be displayed as a main point (focus) within the transparency processing area R' of the display device 300. When the bucket 30 or the boom 20 is in a relatively low position, a portion of the front work apparatus obscuring the front view in the second image may be transparency-processed so that the object may be identified in the synthesized image.

When the bucket 30 or the boom 20 is positioned between the predetermined position and the highest position (100%), the first image captured from the upper camera 110 may be transparency-processed, so that an object implemented by the lower camera 120 may be displayed as a main point (focus) within the transparency processing area R' of the display device 300. When the bucket 30 or the boom 20 is in a relatively high position, a portion of the front work apparatus obscuring the front view in the first image may be transparency-processed so that the object may be identified in the synthesized image.

For example, the predetermined position of the boom may be set such that the rotation angle $\theta$ of the boom 20 is within a range of 15 degrees to 20 degrees.

Alternatively, the second image in the synthesized image may be transparency-processed to be transparent when the rotation angle $\theta$ of the boom is within a first angle range, the first and second images in the transparency processing area of the synthesized image may be transparency-processed to be transparent when the rotation angle $\theta$ of the boom is within a second angle range, and the first image in the synthesized image may be transparency-processed to be transparent when the rotation angle $\theta$ of the boom is within a third angle range. For example, the first angle range may be within $\theta$ degree to 15 degrees, the second angle range may be within 15 degrees to 25 degrees, and the third angle range may be within 25 degrees to 45 degrees.

In example embodiments, an image processing condition for transparency processing the first and second images may be set. The image processing condition in the image processing device 200 may be set through an input portion 400. For example, the image processing condition may include a location, a size, etc. of the transparency processing area. A transparency switching timing of the first and second images may be determined based on the position of the bucket 30 or the bucket 20 and the predetermined bucket or boom position. The transparency processing area may be selected according to a type of equipment.

For example, the input unit 400 may be implemented in a form of an instrument panel option, and the operator may change the timing point for the transparency switching, the area to be processed for transparency, and the like through the input portion 400. The input portion 400 may be provided in a form of a separate manipulation device provided in the driver cabin, a manipulation device integrally provided with the display device, or a touch screen constituting a display screen of the display device. Thus, the operator may set various image processing conditions such as setting a periphery of an object requiring attention during work as the transparent processing area.

As mentioned above, the first image and the second image captured from the upper camera 110 installed in the driver cabin 40 of the wheel loader 10 and the lower camera 120 installed in the front vehicle body 12 may be synthesized into one image, the position of the transparent processing region in the synthesized image may be determined according to the tire pressure information, at least one of the first and second images may be transparency-processed to be transparent in the synthesized image according to the position of the bucket 30 or the boom 20 connected to the front vehicle body 12, and the transparency-processed image may be displayed through the display device 300.

When the bucket 30 or the boom 20 is in a relatively low position between the lowest position (0%) and the predetermined bucket position, in the second image captured from the lower camera 120, the front view of the front vehicle body 12 may be obscured by the front work apparatus including the boom 20 and the bucket 30. When the bucket 30 is in a relatively high position between the predetermined bucket position and the highest position (100%) of the transparency processing area, in the first image captured from the upper camera 110, the front view of the front vehicle body 12 may be obscured by the front work apparatus including the boom 20 and the bucket 30.

The first image and/or the second image may be transparency-processed in the synthesized image according to the position of the bucket 30 or the boom 20, to remove a blind spot that is obscured by the front work apparatus.

Further, when the tire air pressure is lowered, the position of the transparency processing area (R) may also be lowered as the overall height of the wheel loader is lowered. The position of the transparency processing area in the synthesized image may be automatically adjusted according to the tire pressure information obtained through the tire monitoring portion 150.

Accordingly, the transparency processing area may be automatically calibrated by reflecting changes in tire pressure, to thereby provide a more accurate front view and prevent safety accidents in advance.

The present invention has been explained with reference to preferable embodiments, however, those skilled in the art may understand that the present invention may be modified or changed without being deviated from the concept and the scope of the present invention disclosed in the following claims.

THE DESCRIPTION OF THE REFERENCE NUMERALS

10: wheel loader 12: front vehicle body
14: rear vehicle body 20: boom
22: boom cylinder 24: boom angle sensor
30: bucket 32: bucket cylinder
34: tilt arm 40: cabin
70: front wheel 100: camera portion
110: first camera 120: second camera
150: tire monitoring portion 200: image processing device
210: correction value calculator 220: image synthesizer
230: transparency processor 240: image rendering portion
240: storage portion 300: display device
400: input portion

The invention claimed is:

1. A control system for construction machinery, the control system comprising:
an upper camera installed in a driver cabin of a rear vehicle body and configured to photograph a front of the driver cabin;
a lower camera installed in a front vehicle body rotatably connected to the rear vehicle body and configured to photograph a front of the front vehicle body;
a tire monitoring portion configured to detect pressure information on a tire provided in the front vehicle body or the rear vehicle body;

an image processing device configured to synthesize first and second images captured from the upper camera and the lower camera into one image, and configured to determine a position of a transparency processing area in the synthesized image according to the tire pressure information and transparency-process at least one of the first and second images in the transparency processing area; and
a display device configured to display the synthesized image transparency-processed by the image processing device,
wherein the image processing device includes:
a correction value calculator configured to calculate a correction value for height adjustment of the upper camera and the lower camera from the tire pressure information detected by the tire monitoring portion; and
a transparency processor configured to determine the position of the transparency process area in the synthesized image according to the calculated correction value.

2. The control system of claim 1, wherein the correction value calculator compares the detected tire pressure value with a preset standard pressure value to calculate height correction values for the upper camera and the lower camera.

3. The control system of claim 1, further comprising:
a work apparatus posture detection portion configured to detect a posture of a front work apparatus, and
wherein the image processing device is configured to transparency-process the at least one of the first and second images in the synthesized image according to the posture of the front work apparatus detected by the work apparatus posture detection portion.

4. The control system of claim 3, wherein the image processing device is configured to transparency-process the first image in the synthesized image when at least a portion of the front work apparatus invades a predetermined position, and the image processing device is configured to transparency-process the second image in the synthesized image when the work apparatus does not invade the predetermined position.

5. The control system of claim 1, further comprising:
an input portion configured to set an image processing condition in the image processing device.

6. The control system of claim 5, wherein the image processing condition includes a transparency processing switching timing of the first and second images or a ratio of the transparency processing area of the entire display area of the display device.

7. The control system of claim 1, wherein the image processing device is configured to process that, in the transparency processing area, an outline of an exterior of a boom or a bucket of the transparency-processed first and second images is displayed with a line or a dotted line.

8. The control system of claim 7, wherein the outline of the transparency-processed boom or bucket is displayed by transparency-processing an image of the boom or bucket that is taken from the first image or the second image.

9. The control system of claim 1, wherein the image processing device is selectively configured to transparency-process an image of a boom or a bucket coupled to the front vehicle body in the first and second images in the transparent processing area.

10. The control system of claim 1, wherein the synthesized image includes an object recognized by the image processing device in the first image and the second image.

11. The control system of claim 10, wherein the image processing device is configured to recognize a person, animal, building or equipment as the object through a predetermined algorithm.

12. A method of controlling construction machinery, the method comprising:

obtaining a first image of a front of a driver cabin from an upper camera installed in the drive cabin of a rear vehicle body;

obtaining a second image of a front of a front vehicle body from a lower camera installed in the front vehicle body rotatably connected to the rear vehicle body;

obtaining pressure information on a tire provided in the front vehicle body or the rear vehicle body;

synthesizing the first and second images into one image;

determining a position of a transparency processing area in the synthesized image according to the obtained pressure information of the tire;

transparency-processing at least one of the first and second images in the transparency processing area; and displaying the transparency-processed image through a display device, wherein determining the position of the transparency processing area according to the obtained pressure information of the tire includes:

calculating a correction value for height adjustment of the upper camera and the lower camera from the pressure information of the tire; and determining the position of the transparency process area in the synthesized image according to the calculated correction value.

13. The method of claim 12, wherein calculating the correction value for height adjustment of the upper camera and the lower camera from the pressure information of the tire includes comparing the detected tire pressure value with a preset standard pressure value to calculate height correction values for the upper camera and the lower camera.

14. The method of claim 12, further comprising:

detecting a posture of a front work apparatus, and wherein transparency-processing the at least one of the first and second images in the transparency processing area includes transparency-processing the at least one of the first and second images in the synthesized image according to the detected posture of the front work apparatus.

15. The method of claim 12, further comprising:

setting an image processing condition under which the at least one of the first and second images is transparency processed.

16. The method of claim 15, wherein the image processing condition includes a transparency processing switching timing of the first and second images or a ratio of the transparency processing area of the entire display area of the display device.

* * * * *